US011516365B2

(12) United States Patent
Inaba (10) Patent No.: US 11,516,365 B2
(45) Date of Patent: Nov. 29, 2022

(54) IMAGE FORMING APPARATUS AND INSPECTION METHOD OF IMAGE READING SECTION

(71) Applicant: KONICA MINOLTA, INC., Tokyo (JP)

(72) Inventor: Yasunori Inaba, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 17/307,524

(22) Filed: May 4, 2021

(65) Prior Publication Data
US 2021/0360120 A1    Nov. 18, 2021

(30) Foreign Application Priority Data
May 14, 2020   (JP) .............................. JP2020-085138

(51) Int. Cl.
*H04N 1/00*        (2006.01)

(52) U.S. Cl.
CPC ..... *H04N 1/00909* (2013.01); *H04N 1/00013* (2013.01); *H04N 1/00037* (2013.01); *H04N 1/00814* (2013.01); *H04N 2201/0081* (2013.01); *H04N 2201/0082* (2013.01)

(58) Field of Classification Search
CPC ........... H04N 1/02815; H04N 1/02865; H04N 2201/0404; H04N 1/4076; H04N 1/00013; H04N 1/00037; H04N 1/00814; H04N 1/00909; H04N 2201/0081; H04N 2201/0082

USPC ......................................................... 358/461
See application file for complete search history.

(56) References Cited

U.S. PATENT DOCUMENTS

| 7,817,317 | B2 * | 10/2010 | Ito .................... | H04N 1/4076 358/516 |
| 10,682,870 | B2 * | 6/2020 | Tobita ............... | B41J 11/0095 |
| 10,848,626 | B2 * | 11/2020 | Honda ............... | H04N 1/00037 |
| 2005/0206968 | A1 * | 9/2005 | Sodeura ............ | H04N 1/00082 358/474 |
| 2005/0275908 | A1 * | 12/2005 | Nogami ............. | H04N 1/02865 358/497 |
| 2017/0331984 | A1 * | 11/2017 | Akagi ............... | H04N 1/00023 |
| 2018/0272694 | A1 * | 9/2018 | Gohda ............... | B41J 11/42 |
| 2018/0272770 | A1 * | 9/2018 | Tobita .............. | B65G 47/268 |
| 2019/0023042 | A1 * | 1/2019 | Inaba ............... | B41J 2/2142 |
| 2019/0030913 | A1 * | 1/2019 | Inaba ............... | B41J 2/2107 |

(Continued)

FOREIGN PATENT DOCUMENTS

JP        2018197165 A    12/2018

*Primary Examiner* — Negussie Worku
(74) *Attorney, Agent, or Firm* — Buchanan Ingersoll & Rooney PC (57) ABSTRACT

Provided are an image forming apparatus and an inspection method of an image reading section capable of precisely detecting dirt that adheres to a dustproof glass. The image forming apparatus is provided with an image forming section, an image reading section, and a controlling section. The image reading section has a light source, a sensor, and a dustproof glass. At the time of the compensation processing operation of the image reading section, the controlling section detects dirt on the dustproof glass on the basis of a detection value acquired by the sensor when light is emitted from the light source onto a reflective member for compensation that specularly reflects the light.

7 Claims, 5 Drawing Sheets

(56) References Cited

U.S. PATENT DOCUMENTS

| | | | |
|---|---|---|---|
| 2019/0281186 A1* | 9/2019 | Kanaya | H04N 1/4076 |
| 2020/0053248 A1* | 2/2020 | Ozawa | G01N 21/94 |
| 2020/0076980 A1* | 3/2020 | Inaba | H04N 1/19 |
| 2021/0008879 A1* | 1/2021 | Gohda | B41J 2/04586 |
| 2021/0377415 A1* | 12/2021 | Hasegawa | H04N 1/00795 |
| 2022/0011705 A1* | 1/2022 | Shirasaki | G03G 15/80 |
| 2022/0060599 A1* | 2/2022 | Aoki | H04N 1/1215 |
| 2022/0174164 A1* | 6/2022 | Sugata | H04N 1/00702 |
| 2022/0179334 A1* | 6/2022 | Doshida | H04N 1/00018 |

* cited by examiner

IMAGE FORMING APPARATUS AND INSPECTION METHOD OF IMAGE READING SECTION

CROSS-REFERENCE TO RELATED APPLICATIONS

The entire disclosure of Japanese Patent Application No. 2020-85138, filed on May 14, 2020, is incorporated herein by reference in its entirety.

BACKGROUND

Technological Field

The present invention relates to an image forming apparatus and an inspection method of an image reading section.

Description of the Related Art

An image forming apparatus is typically provided with an image reading section that reads an image formed on a recording medium, in order to confirm the quality of the formed image. The image reading section emits light onto an image surface formed on the recording medium, and detects the light reflected from the image surface by a sensor. Also, the image reading section is provided with a dustproof glass in order to prevent a foreign substance, such as dust and powdery dirt, from intruding into the sensor and an optical system. The foreign substance, such as paper dust caused in conveying the recording medium and a fingerprint during cleaning, adheres to the dustproof glass. Then, the foreign substance that adheres to the dustproof glass lowers the resolution of the image read by the image reading section, so that the reading accuracy can be lowered.

Consequently, dirt on the dustproof glass is conventionally detected at the time of the compensation processing of the image reading section. As described in, for example, Patent Literature 1 (Japanese Unexamined Patent Application Publication No. 2018-197165), there is a technology for detecting such the dirt on the dustproof glass.

Also, the detection operation for the dirt on the dustproof glass uses a sheet on which a black chart is formed as a surface to be read. And, the image reading section reads the black chart as a background, and detects the contrast difference between the background (black) and the location to which the foreign substance, such as the fingerprint and dust, adheres, thereby detecting the dirt on the dustproof glass.

CITATION LIST

Patent Literature

Patent Literature 1: Japanese Unexamined Patent Application Publication No. 2018-197165

SUMMARY

However, even when the black chart is used as the surface to be read, the brightness level detected by the sensor cannot be lowered to near the 0 level. Consequently, the contrast difference between the location to which the foreign substance adheres and the background cannot be greatly acquired, so that there is a problem that the dirt that adheres to the dustproof glass cannot be precisely detected.

In view of the conventional problems as described above, an object of the present invention is to provide an image forming apparatus and an inspection method of an image reading section capable of precisely detecting dirt that adheres to a dustproof glass.

To solve the above problems and to achieve the object of the present invention, an image forming apparatus of the present invention is provided with an image forming section that forms an image on a recording medium, an image reading section that reads the image formed on the recording medium, and a controlling section that controls the image reading section. The image reading section has a light source, a sensor, a housing, and a dustproof glass. The light source emits light onto an image surface formed on the recording medium. The sensor detects the light, and outputs a detection value to the controlling section. The housing accommodates the sensor, and has an opening formed in a face opposite to the recording medium. The dustproof glass is provided in the opening of the housing. And, at the time of the compensation processing operation of the image reading section, the controlling section detects dirt on the dustproof glass on the basis of the detection value acquired by the sensor when the light is emitted from the light source onto a reflective member for compensation that specularly reflects the light.

Also, an inspection method of an image reading section of the present invention includes processes represented in (1) to (3) below.

(1) A process for emitting light from a light source onto a reflective member for compensation that specularly reflects the light.

(2) A process for detecting the light by a sensor of the image reading section when the light is emitted from the light source.

(3) A process for detecting dirt on a dustproof glass provided in the image reading section on the basis of a detection value detected by the sensor.

According to the image forming apparatus and the inspection method of the image reading section having the above configuration, the fingerprint, the foreign substance, and the like that adhere to the dustproof glass can be precisely detected.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of limits of the present invention:

FIGS. 3A and 3B illustrate imaging sections configuring the image reading section of the image forming apparatus according to the embodiment of the present invention, in which

DETAILED DESCRIPTION OF EMBODIMENTS

Hereinafter, embodiments for carrying out the present invention will be described with reference to the appended drawings. However, the scope of the invention is not limited to the embodiments. Hereinafter, an embodiment of the present invention will be described with reference to FIGS. 1 to 5. It should be noted that members shared among the respective drawings are indicated by the same reference numerals.

1. The Embodiment 1-1. The Configuration Example of an Image Forming Apparatus First, the configuration example of an image forming apparatus according to the embodiment (hereinafter, referred to as "this example") of the present invention will be described with reference to FIG. 1.

Figure 1:
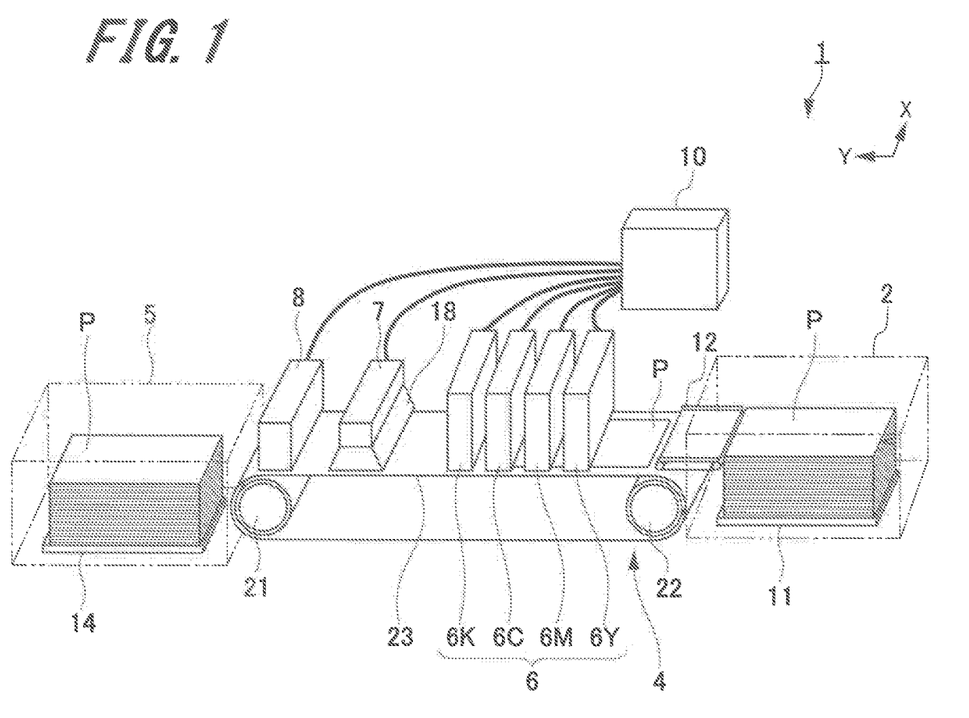
FIG. 1 is an overall configuration diagram illustrating an image forming apparatus according to an embodiment of the present invention.

FIG. 1 is a schematic configuration diagram illustrating the overall configuration of the image forming apparatus.

An image forming apparatus 1 shown in FIG. 1 is an ink jet recording apparatus that forms (records) an image on a recording medium by discharging ink from a nozzle provided in an ink jet head. The image forming apparatus 1 is a color image forming apparatus that overlaps inks of four colors of yellow (Y), magenta (M), cyan (C), and black (K) with each other.

The image forming apparatus 1 has a sheet feeding section 2, a conveying section 4, an ejecting section 5, an image forming section 6, a fixing section 7, an image reading section 8, and a controlling section 10. And, the image forming apparatus 1 forms image data inputted from an external device 100 (see FIG. 4) on each sheet P that shows an example of the recording medium.

The sheet feeding section 2 has a sheet feed tray 11 and a sheet supplying section 12. The sheet feed tray 11 is a plate-shaped member provided so that the each sheet P that shows the example of the recording medium can be placed. The sheet feed tray 11 is provided so as to be movable in the up-down direction according to the number of the sheets P placed. And, the topmost sheet P in the up-down direction among a plurality of sheets placed on the sheet feed tray 11 is held at the position where the topmost sheet P is conveyed by the sheet supplying section 12.

The sheet supplying section 12 has a plurality (in this example, two) of rollers and a belt member. The belt member is endlessly formed so as to have both ends in the longitudinal direction being connected. The belt member is entrained about the rollers. And, one of the rollers is rotatably driven to circulate and move the belt member between the two rollers. Thus, the sheet P placed on the belt member is conveyed.

Also, the sheet supplying section 12 has a driving section, not illustrated, rotatably driving the rollers, and a supplying device that delivers the topmost sheet P placed on the sheet feed tray 11 to the belt member. And, the sheet supplying section 12 conveys the sheet P placed on the belt member toward the conveying section 4, and feeds the sheet P to the image forming section 6.

Further, the sheet supplying section 12 has a guide member that aligns the position of the sheet P in a width direction X perpendicular to a conveying direction Y. And, the sheet supplying section 12 aligns the position in the width direction X of the sheet P to be fed to the conveying section 4 with a predetermined position.

The conveying section 4 has a driving roller 21, a driven roller 22, and a conveying belt 23. The driving roller 21 and the driven roller 22 are formed in substantially cylindrical shape. And, the driving roller 21 and the driven roller 22 are disposed so that their axial direction is parallel to the width direction X. The driving roller 21 and the driven roller 22 are disposed so as to be spaced from each other at predetermined intervals in the conveying direction Y. In this example, the driving roller 21 is disposed on the downstream side in the conveying direction Y with respect to the driven roller 22. A conveying driving section 51 (see FIG. 4) is connected to the driving roller 21. And, the driving roller 21 is rotatably driven by the conveying driving section 51.

The conveying belt 23 is configured of a steel belt that has flexibility and includes a plurality of plate-shaped steel plates joined to each other. The conveying belt 23 is endlessly formed so as to have both ends in the longitudinal direction being connected. A plurality of suction holes 25 are opened in the conveying belt 23. The suction holes 25 are opened in substantially circular shape. The suction holes 25 are formed in the steel plates by etching.

As shown in FIG. 1, the conveying belt 23 that has the above configuration is entrained about the driving roller 21 and the driven roller 22. The driving roller 21 is rotatably driven to circulate and move the conveying belt 23 between the driving roller 21 and the driven roller 22. Thus, the sheet P placed on the conveying belt 23 is conveyed.

Also, the conveying section 4 has a suctioning section, not illustrated. The suctioning section is configured of a suctioning fan. The suctioning section is disposed on the face of the conveying belt 23 opposite to the placing face of the conveying belt 23 on which the sheet P is placed. The suctioning section suctions the sheet P through the suction holes 25 and suction holes 26 provided in the conveying belt 23. Thus, when the sheet P is conveyed by the conveying section 4, the position of the sheet P can be prevented from being shifted.

Also, the image forming section 6, the fixing section 7, and the image reading section 8 are disposed opposite to the placing face of the conveying belt 23 in the conveying section 4. The image forming section 6 is disposed on the upstream side in the conveying direction Y with respect to the fixing section 7 and the image reading section 8.

The image forming section 6 has four head units 6Y, 6M. 6C, and 6K according to the yellow (Y), the magenta (M), the cyan (C), and the black (K). The four head units 6Y, 6M, 6C, and 6K are disposed, for example, in the order of the yellow, the magenta, the cyan, and the black from the upstream side in the conveying direction Y.

The head units 6Y. 6M, 6C, and 6K are set to the length (width) that covers the entire sheet P in the width direction X. That is, the image forming apparatus 1 is a line head type image forming apparatus of one-pass system. The four head units 6Y, 6M, 6C, and 6K mutually have the same configuration only except that the inks discharged from the four head units 6Y, 6M, 6C, and 6K are respectively different in color. It should be noted that in this example, the example in which the image forming apparatus of one-pass system is applied as the image forming apparatus 1 has been described, but the present invention is not limited to this, and is also applicable to the image forming apparatus of scanning system in which the head units are moved in the direction perpendicular to the conveying direction to perform the image formation.

Figure 4:
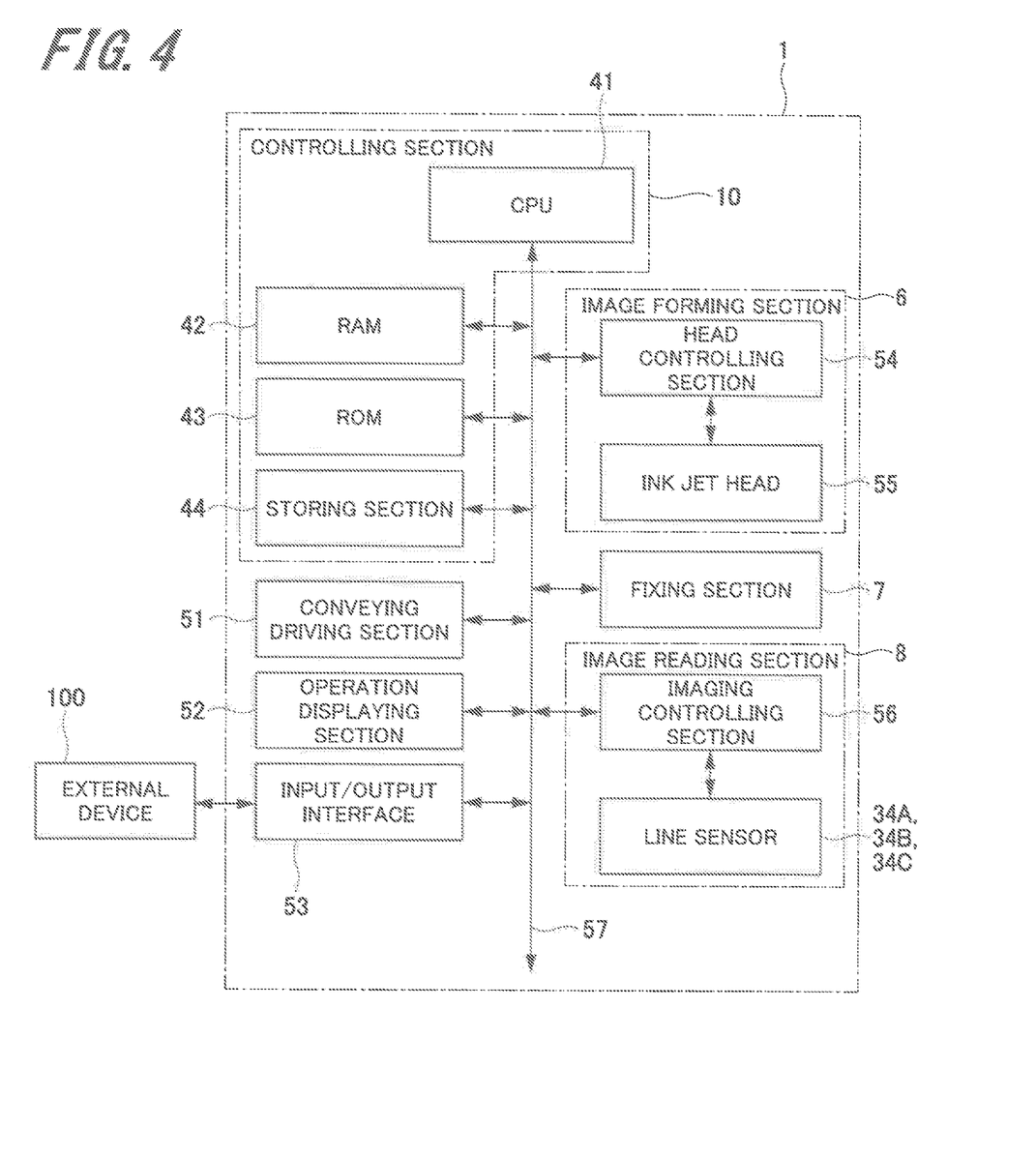
FIG. 4 is a block diagram illustrating the configuration of a control system of the image forming apparatus according to the embodiment of the present invention.

The head units 6Y, 6M, 6C, and 6K each have a plurality of ink jet heads 55 (see FIG. 4). And, a set of two ink jet heads 55 configures one ink jet module.

A plurality of ink jet modules are aligned in two columns along the conveying direction Y. And, four ink jet modules in one column are disposed so as to be aligned along the width direction X. Also, the ink jet modules in two columns are disposed so as to be staggered along the conveying direction Y. It should be noted that the head units 6Y, 6M. 6C, and 6K may be each one head unit in which a plurality of nozzles are disposed in one unit.

Also, each of the ink jet heads 55 has a plurality of nozzles. And, the ink jet head 55 discharges the ink from the nozzles to the sheet P. Thus, the image is formed on the sheet P placed on the conveying belt 23 of the conveying section 4.

It should be noted that a heating section that heats the sheet P to a predetermined temperature may be provided between the image forming section 6 and the sheet feeding section 2.

The fixing section 7 is disposed on the downstream side in the conveying direction Y with respect to the image forming section 6. For the fixing section 7, for example, a fluorescent tube, such as a low pressure mercury lamp, emitting ultraviolet light is applied. And, the fixing section 7 emits the ultraviolet light toward the sheet P conveyed by the conveying belt 23, and cures the ink discharged onto the sheet P. Thus, the fixing section 7 fixes the image formed on the sheet P.

Examples of the fluorescent tube that emits the ultraviolet light include, besides the low pressure mercury lamp, a mercury lamp that has an operation pressure of about several hundreds of Pa to about 1 MPa, a light source that can be used as a bactericidal lamp, a cold cathode tube, an ultraviolet laser light source, a metal halide lamp, a light emitting diode, and the like. Among these, the light source that can emit the ultraviolet light at a higher illumination intensity and has little power consumption (for example, the light emitting diode and the like) is more desirable.

It should be noted that the present invention is not limited to the fixing section 7 that emits the ultraviolet light, and the fixing section 7 should emit an energy ray that has properties curing the ink according to the properties of the ink, and the light source is also replaced according to the wavelength and the like of the energy ray. Further, the present invention is not limited to the fixing section 7 that emits light, such as the ultraviolet light. It is possible to apply the fixing section 7 that uses other various methods, such as, for example, a method such that the ink is dried by providing heat to the sheet and a method such that a liquid that allows the ink to cause chemical change is provided.

Also, a light shielding plate 18 is provided at the end of the fixing section 7 opposite to the conveying belt 23. The light shielding plate 18 is disposed so as to surround the range of the ultraviolet light emission by the fixing section 7. And, the light shielding plate 18 prevents the ultraviolet light from leaking out of the emission range. This can prevent the curing of the ink in the nozzles of the ink jet head 55 due to the application of the ultraviolet light emitted from the fixing section 7 onto the image forming section 6.

Also, the image reading section 8 is disposed on the downstream side in the conveying direction Y with respect to the fixing section 7. The image reading section 8 reads the image formed on the sheet P. And, the image reading section 8 outputs the read image information to the controlling section 10. It should be noted that the detailed configuration of the image reading section 8 will be described later.

Also, the ejecting section 5 is disposed on the downstream side in the conveying direction with respect to the image reading section 8. That is, the ejecting section 5 is disposed in the most downstream in the conveying direction Y with respect to the conveying section 4, and the image forming section 6, the fixing section 7, and the image reading section 8 are disposed between the sheet feeding section 2 and the ejecting section 5.

The ejecting section 5 stores the sheet P that is conveyed from the conveying section 4 and on which the image is formed by the image forming section 6 and the fixing section 7. The ejecting section 5 has an ejected sheet tray 14 in plate shape. And, the ejecting section 5 places, on the ejected sheet tray 14, the sheet P on which the image is formed.

Next, the configuration of the image reading section 8 will be described with reference to FIGS. 2, 3A, and 3B.

Figure 2:
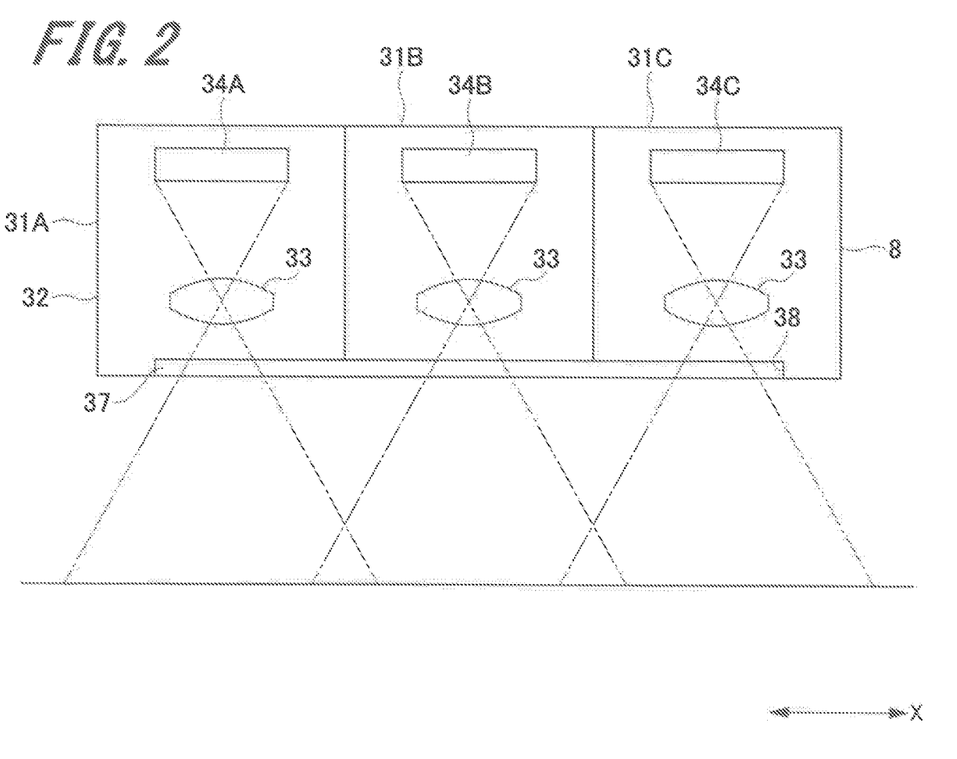
FIG. 2 is a schematic configuration diagram illustrating an image reading section of the image forming apparatus according to the embodiment of the present invention.
Figure 3A:
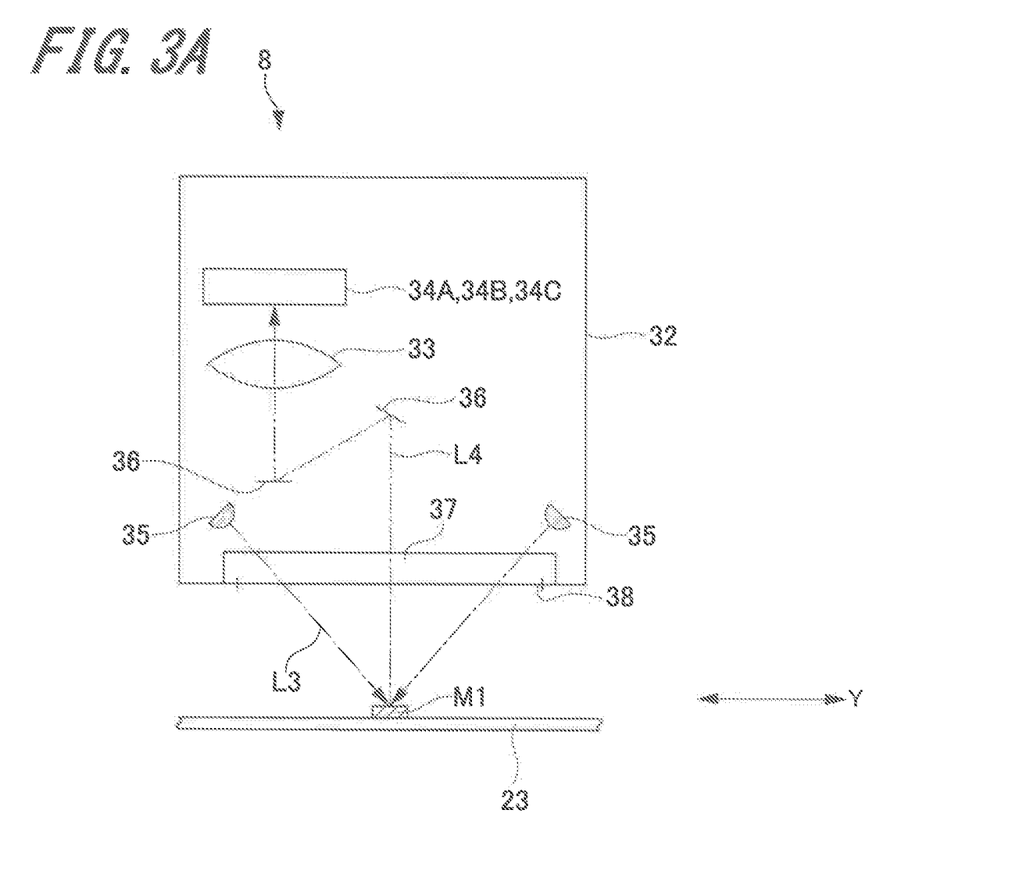
FIG. 3A is a schematic configuration diagram of the imaging section.
Figure 3B:
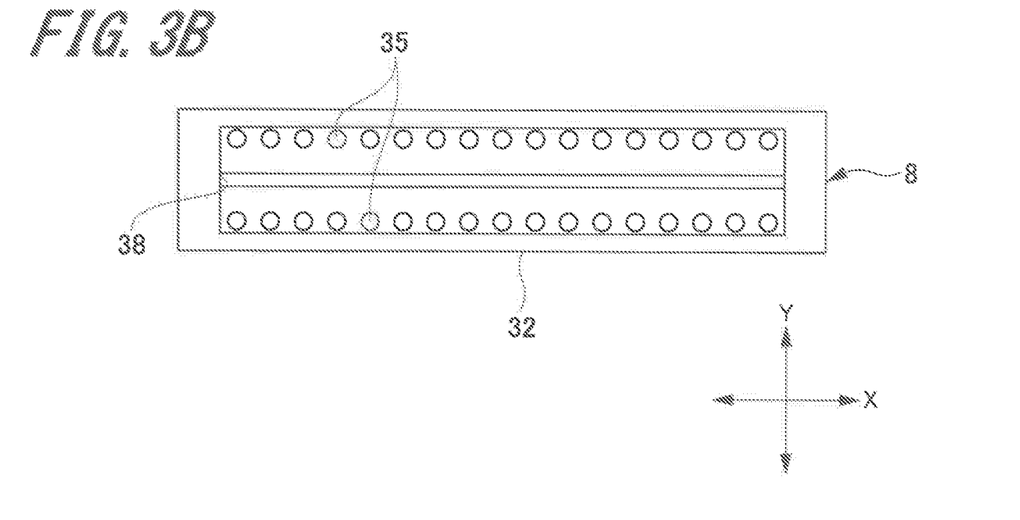
FIG. 3B is a plan view of the imaging section seen from the recording medium side.

FIG. 2 is a schematic configuration diagram illustrating the image reading section 8, and FIGS. 3A and 3B illustrate imaging sections 31A, 31B, and 31C configuring the image reading section 8, in which FIG. 3A is a schematic configuration diagram illustrating the imaging section 31A, and FIG. 3B is a plan view of the imaging section 31A seen from the recording medium side, that is, the conveying belt side.

As illustrated in FIG. 2, the image reading section 8 is opposite to the conveying belt 23, and is disposed along the width direction X. The image reading section 8 has the first imaging section 31A, the second imaging section 31B, and the third imaging section 31C. The first imaging section 31A, the second imaging section 31B, and the third imaging section 31C are disposed side by side along the width direction X.

As illustrated in FIG. 3A the first imaging section 31A has a housing 32, a lens 33, a first line sensor 34A, a plurality of light sources 35, a plurality of reflecting sections 36, and a dustproof glass 37. The lens 33, the first line sensor 34A, the plurality of light sources 35, and the plurality of reflecting sections 36 are accommodated in the housing 32.

An opening 38 is formed in the face of the housing 32 opposite to the conveying belt 23. The dustproof glass 37 is fitted in the opening 38. The dustproof glass 37 prevents dust and powdery dirt from entering the interior of the housing 32 from the opening 38.

The lens 33 and the plurality of reflecting sections 36 focus the light toward the first line sensor 34A. The first line sensor 34A is configured of, for example, a CCD (Charge Coupled Device) sensor or a CMOS (Complementary Metal Oxide Semiconductor) sensor. And, a plurality of detection elements are disposed side by side along the width direction X in the first line sensor 34A. That is, the detection face of the first line sensor 34A is disposed in linear shape.

The plurality of light sources 35 are each configured of, for example, a LED (Light Emitting Diode). The plurality of light sources 35 are disposed near the dustproof glass 37 in the housing 32. As illustrated in FIG. 3B, the plurality of light sources 35 are disposed in row shape along the width direction X. Also, the plurality of light sources 35 in two rows are disposed so as to be spaced from each other in the conveying direction Y. As illustrated in FIG. 3A, an optical axis (hereinafter, referred to as a detection axis) L4 from the conveying belt 23 to the first line sensor 34A passes through between the plurality of light sources 35 in two rows. It should be noted that the detection axis L4 that passes through the dustproof glass 37 is perpendicular to the width direction X and the conveying direction Y. That is, the detection axis L4 is perpendicular to the conveying face of the conveying belt 23.

The light emitted from each of the light sources 35 passes through the dustproof glass 37, and is applied toward the conveying belt 23. It should be noted that the light source 35 emits the light at a predetermined incidence angle θ (for example, 45 degrees) relative to the conveying belt 23. And, an optical axis (hereinafter, referred to as an emission axis) L3 of the light emitted from the light source 35 is inclined relative to the direction perpendicular to the conveying belt 23. Here, since the detection axis L4 is parallel to the direction perpendicular to the conveying belt 23, the emission axis L3 is inclined relative to the detection axis L4. For this, the emission axis L3 and the detection axes L4 do not overlap each other. Also, since as described above, the detection axis L4 is perpendicular to the conveying face of the conveying belt 23, the emission axis L3 reflected on the conveying belt 23 does not overlap with the detection axis L4.

It should be noted that the inclination angle of the emission axis L3 relative to the detection axis L4 should be an angle at which the light emitted from the light source 35 does not enter the detection face of the line sensor 34A, 34B, or 34C when the light is reflected on a reflective mirror M1 described later. Also, the light emitted from the light source 35 by using an optical component, such as a mirror and a prism, may be incident obliquely on the reflective mirror M1.

Also, when the image is read, the light emitted from the light source 35 is reflected (scattered) by the recording medium P placed on the conveying belt 23, and is incident on the first line sensor 34A through the plurality of reflecting sections 36 and the lens 33. Thus, the first line sensor 34A reads the image formed on the sheet P by the image forming section 6 and the fixing section 7. The data of the read image is sent to the controlling section 10.

It should be noted that the reading width of the detection elements that configure the first line sensor 34A is set to be wider than the interval between the nozzles of the ink jet head 55. Also, the resolution of the first line sensor 34A is set to be coarser than the resolution of the head unit.

Also, the second imaging section 31B has the lens 33 and the second line sensor 34B, and the third imaging section 31C has the lens 33 and the third line sensor 34C. And, since the configuration of each of the second imaging section 31B and the third imaging section 31C is the same as the first imaging section 31A, and the description thereof is omitted.

1-2. The Configuration Example of a Control System

Next, the configuration of a control system of the image forming apparatus 1 will be described with reference to FIG. 4.

FIG. 4 is a block diagram illustrating the configuration of the control system of the image forming apparatus 1.

As illustrated in FIG. 4, the image forming apparatus 1 is provided with the controlling section 10, the conveying driving section 51, an operation displaying section 52, an input/output interface 53, the image forming section 6, the fixing section 7, and the image reading section 8. The controlling section 10 has, for example, a CPU (Central Processing Unit) 41, a RAM (Random Access Memory) 42 used as the working region of the CPU 41, and a ROM (Read Only Memory) 43 for storing a program and the like executed by the CPU 41.

Further, the controlling section 10 has a storing section 44 that includes a hard disk drive (HDD) as a large capacity storing device and the like. The data information of the image read by the image reading section 8 and the like are stored in the storing section 44.

The CPU 41 of the controlling section 10 is connected to each of the image forming section 6, the fixing section 7, the image reading section 8, the RAM 42, the ROM 43, the storing section 44, the conveying driving section 51, the operation displaying section 52, and the input/output interface 53 through a system bus 57. And, the CPU 41 controls the entire apparatus.

The conveying driving section 51 is controlled by the controlling section 10, drives the driving roller 21 and the sheet supplying section 12, and feeds and conveys the sheet P at a predetermined timing.

The operation displaying section 52 is a touch panel including a display, such as a liquid crystal displaying device (LCD) or an organic ELD (Electro Luminescence Display). The operation displaying section 52 displays an instruction menu to the user, the information about the detection operation for the discharging from the nozzle, the information about the inclination of the line sensors 34A, 34B, and 34C of the image forming section 6, the information about the acquired image data, and the like. Further, the operation displaying section 52 is provided with a plurality of keys, and has a role as an inputting section that receives the input of the data, such as various instructions, letters, and numbers, by the key operation of the user.

The input/output interface 53 is connected to the external device 100, such as a PC (personal computer) and a facsimile device. And, the input/output interface 53 receives the image data from the external device 100. The input/output interface 53 outputs the received image data to the controlling section 10. And, the controlling section 10 image-processes the image data received from the input/output interface 53. Also, the controlling section 10 subjects the received image data to the image processing, such as shading compensation, image density adjustment, and image compression, if necessary.

Also, the image forming section 6 receives the image data image-processed by the controlling section 10, and forms a predetermined image on the sheet P on the basis of the image data. Specifically, the image forming section 6 controls the ink jet head 55 by a head controlling section 54, and discharges the ink from the ink jet head 55 to a predetermined position.

The image formed on the sheet P by the image forming section 6 is read by the image reading section 8, and the image data is then sent to the controlling section 10. Also, the image reading section 8 controls each of the line sensors 34A, 34B, and 34C by an imaging controlling section 56, and reads the image at a predetermined timing.

Also, the controlling section 10 performs the shading compensation of each of the line sensors 34A, 34B, and 34C, and detects dirt on the dustproof glass 37 on the basis of the detection value of the image reading section 8 at the time of the compensation processing of the image reading section 8.

2. The Compensation Processing Method of the Image Reading Section

Next, an example of the compensation processing method of the image reading section in the image forming apparatus 1 that has the above configuration will be described with reference to FIGS. 3A and 5. It should be noted that as an example of the compensation processing operation, the dirt detection operation for the dustproof glass 37 will be described.

Figure 5:
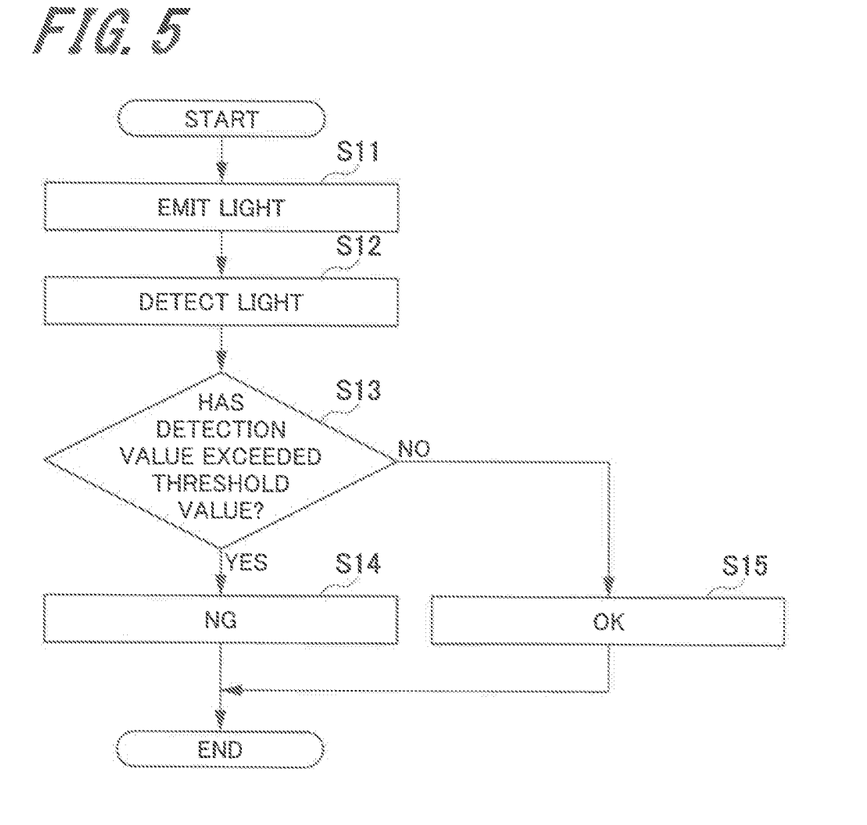
FIG. 5 is a flowchart illustrating a dirt detection operation for a dustproof glass of the image forming apparatus according to the embodiment of the present invention.

FIG. 5 is a flowchart illustrating the compensation processing of the image reading section 8.

First, when the compensation processing operation is performed, as illustrated in FIG. 3A, the reflective mirror M1 is placed, as a reflective member for compensation, on the conveying belt 23. And, the controlling section 10 controls the conveying driving section 51, and conveys the reflective mirror M1 to the image reading section 8. It should be noted that although in this example, the example in which the reflective mirror M1 is conveyed to the image reading section 8 by using the conveying belt 23 has been described, the present invention is not limited to this. For example, a compensation processing mechanism may be disposed at the position opposite to the image reading section 8 to install the reflective mirror M1 in the compensation processing mechanism.

When the reflective mirror M1 is set to the position opposite to the image reading section 8 that is a predetermined position, the controlling section 10 causes the light source 35 of each of the imaging sections 31A, 31B, and 31C to be luminous. And, as illustrated in FIG. 3A, the light is emitted toward the reflective mirror M1 (step S11). The reflective mirror M1 reflects the light emitted from the light source 35 at a reflection angle θ that is the same angle as the incidence angle θ.

Next, the light is detected by using each of the line sensors 34A, 34B, and 34C (step S12). As described above, the emission axis L3 is inclined relative to the detection axis L4. Further, the scattered light caused when the light is incident can be reduced to be very small by using the reflective mirror M1 that has a specular surface as a surface to be read. For this, the light reflected by the reflective mirror M1 is not incident on each of the line sensors 34A, 34B, and 34C along the detection axis L4. Thus, by using the reflective mirror M1 as the surface to be read, the brightness level of the light detected by each of the line sensors 34A, 34B, and 34C can be reduced to the approximately 0 level, as compared with the case where the black chart is used.

Here, when the dirt, such as a fingerprint and dust, adheres to the dustproof glass 37, the light emitted from the light source 35 is scattered by the dirt that adheres to the dustproof glass 37. And, the light scattered by the dirt (scattered light) is incident on each of the line sensors 34A, 34B, and 34C through the plurality of reflecting sections 36 and the lens 33. As described above, since the light that is incident on the reflective mirror M1 is not incident on each of the line sensors 34A, 34B, and 34C, the light contrast difference between the location of the dustproof glass 37 to which the dirt adheres and the background can be increased.

Next, the controlling section 10 acquires the detection value detected by each of the line sensors 34A. 34B, and 34C. And, the controlling section 10 determines whether or not the detection value has exceeded the previously set threshold value (step S13). Here, when the dirt adheres to the dustproof glass 37, the light contrast difference between the location of the dustproof glass 37 to which the dirt adheres and the background becomes large, so that the detection value of each of the line sensors 34A. 34B, and 34C becomes large.

When it is determined in the process in step S13 that the detection value has exceeded the threshold value (the YES determination in step S13), the controlling section 10 determines that the dirt adheres to the dustproof glass 37. And, the controlling section 10 determines that the current state of the image reading section 8 is NG (step S14). Also, the controlling section 10 notifies, to the user, that the dustproof glass 37 is dirty, and performs the cleaning operation for the dustproof glass 37 by using the cleaning mechanism.

On the other hand, when it is determined in the process in step S13 that the detection value has not exceeded the threshold value (the NO determination in step S13), the controlling section 10 determines that the dirt does not adhere to the dustproof glass 37. And, the controlling section 10 determines that the current state of the image reading section 8 is OK (normal) (step S15). Thus, the dirt detection operation for the dustproof glass 37 that is one of the compensation processing operations is completed. Also, when the dirt detection operation is completed, the reflective mirror M1 is removed from the conveying belt 23.

As described above, the contrast difference between the location to which the dirt adheres and the background can be increased by using the reflective mirror M1 that reflects the light at the time of the dirt detection operation. Thus, the dirt that adheres to the dustproof glass 37 can be precisely detected. Further, since the contrast difference can be increased, the dirt that adheres to the dustproof glass 37 can be detected even when the line sensor having a low S/N ratio is applied.

Further, when not only the dirt detection for the dustproof glass 37, but also the black compensation (black shading compensation) of the line sensors 34A, 34B, and 34C, is performed, the reflective mirror M1 may be used as the surface to be read. Also in the black shading compensation, like the dirt detection operation, the light is emitted onto the reflective mirror M1 to acquire the detection value of each of the line sensors 34A. 34B, and 34C. And, of the high density side dynamic range level and the low density side dynamic range level of the reading brightness of the line sensors 34A, 34B, and 34C, the low density side dynamic range level is particularly adjusted on the basis of the detection value.

In this way, the brightness level of the light detected by the line sensors 34A, 34B, and 34C can be reduced to the approximately 0 level by using, as the reflective member for compensation, the reflective mirror M1 in which the surface to be read performs the specular reflection. Thus, the high density side dynamic range level or the low density side dynamic range level of the reading brightness of the line sensors 34A, 34B, and 34C can be enlarged.

Further, in a state where the light source 35 is turned on, the black shading compensation is performed. Therefore, the black shading compensation can be performed in the same state as the state of reading the image actually formed on the sheet P, so that the compensation accuracy can be improved.

It should be noted that according to the image reading section 8 of this example, the foreign substance that adheres, not only to the dustproof glass 37, but also to the plurality of reflecting sections 36, can be detected.

It should be noted that the present invention is not limited to the embodiment described above and illustrated in the drawings, and various modifications can be made within the scope not departing from the purport of the invention described in the scope of claims.

Although in the embodiment described above, the example in which the reflective mirror M1 is applied as the reflective member for compensation has been described, the present invention is not limited to this. The reflective member for compensation should be a member in which the surface to be read specularly reflects the light, and for example, a flat member having little unevenness, may be applied.

Also, the light that is scattered on the surface to be read can be further reduced by using, as the light emitted onto the surface to be read, diffusion light rather than collimation light having high directivity. Therefore, it is preferable to cause the light emitted onto the surface to be read, to be the diffusion light by providing a diffusion plate that diffuses the light to the front in the light emitting direction in the light source 35 or using, as the light source 35, the light source in dome shape.

Further, in the embodiment described above, the present invention is not limited to the ink jet recording apparatus as the image forming apparatus, and is also applicable, as the image forming apparatus, to an image forming apparatus of electrophotographic system in which toner is fixed onto the recording medium, or to other various image forming apparatuses.

Also, although the example in which the controlling section 10 that controls the entire image forming apparatus 1 is applied as the controlling section has been described, the present invention is not limited to this, and the controlling section that controls only the image reading section 8 may be applied.

Although in the embodiment described above, the example in which three line sensors are provided has been described, the number of line sensors is not limited to this, and four or more line sensors may be provided along the width direction X, or only one line sensor may be provided.

Also, although in the embodiment described above, the example in which the sheet is used as the recording medium has been described, the present invention is not limited to this, and as the recording medium, other various recording media, such as, for example, a wiping cloth, a plastic film, and a glass plate, are applicable.

Although the embodiments of the present invention have been described and illustrated above, the disclosed embodiments are made for purposes of illustration and example only and not limitation. The scope of the present invention should be interpreted by the terms of the appended claims.

REFERENCE SIGNS LIST

1 . . . image forming apparatus, 2 . . . sheet feeding section, 4 . . . conveying section, 5 . . . ejecting section, 6 . . . image forming section, 6Y, 6M, 6C, 6K . . . head unit, 7 . . . fixing section. 8 . . . image reading section, 10 . . . controlling section. 11 . . . sheet feed tray, 12 . . . sheet supplying section. 14 . . . ejected sheet tray, 21 . . . driving roller. 22 . . . driven roller, 23 . . . conveying belt, 31A, 31B, 31C . . . imaging section. 32 . . . housing, 33 . . . lens, 34A, 34B, 34C . . . line sensor. 35 . . . light source, 36 . . . reflecting section, 37 . . . dustproof glass, 38 . . . opening, 41 . . . CPU, 42 . . . RAM, 43 . . . ROM, 44 . . . storing section, 51 . . . conveying driving section, 52 . . . operation displaying section, 53 . . . input/output interface, 54 head controlling section, 55 . . . ink jet head, 56 . . . imaging controlling section, 57 . . . system bus, 100 . . . external device, M1 . . . reflective mirror (reflective member for compensation), P . . . sheet (recording medium), L3 . . . emission axis, L4 . . . detection axis, X . . . width direction, Y . . . conveying direction, θ . . . incidence angle, reflection angle

The invention claimed is:

1. An image forming apparatus comprising:
    an image forming section that forms an image on a recording medium;
    an image reading section that reads the image formed on the recording medium; and
    a hardware processor configured to control the image reading section,
    wherein the image reading section has:
    a light source that emits light onto an image surface formed on the recording medium;
    a sensor that detects the light and outputs a detection value to the hardware processor;
    a housing that accommodates the sensor and has an opening formed in a face opposite to the recording medium; and
    a dustproof glass that is provided in the opening of the housing, and
    wherein at the time of a compensation processing operation of the image reading section, the hardware processor detects dirt on the dustproof glass on the basis of the detection value acquired by the sensor when the light is emitted from the light source onto a reflective member for compensation that specularly reflects the light.

2. The image forming apparatus according to claim 1, wherein when the light emitted from the light source is reflected on the reflective member for compensation, the light emitted from the light source is incident on the reflective member for compensation at an angle at which the light does not enter the detection face of the sensor.

3. The image forming apparatus according to claim 1, wherein an optical axis of the light emitted from the light source is inclined relative to a detection axis of the sensor.

4. The image forming apparatus according to claim 3, wherein the detection axis of the sensor is perpendicular to a surface to be read of the reflective member for compensation, and
wherein the light source obliquely emits the light onto the surface to be read of the reflective member for compensation.

5. The image forming apparatus according to claim 1, wherein the hardware processor performs the black shading compensation of the sensor on the basis of the detection value acquired by the sensor when the light is emitted from the light source onto the reflective member for compensation.

6. The image forming apparatus according to claim 1, wherein the reflective member for compensation has the surface to be read onto which the light is emitted from the light source being flat, and is a reflective mirror that specularly reflects the light.

7. An inspection method of an image reading section that reads an image formed on a recording medium comprising:
    a process for emitting light from a light source onto a reflective member for compensation that specularly reflects the light;
    a process for detecting the light by a sensor of the image reading section when the light is emitted from the light source; and
    a process for detecting dirt on a dustproof glass provided in the image reading section on the basis of a detection value detected by the sensor.

* * * * *